US011383595B2

(12) United States Patent
Naveed et al.

(10) Patent No.: US 11,383,595 B2
(45) Date of Patent: Jul. 12, 2022

(54) SNOW DOOR INTEGRATED IN ADAPTER

(71) Applicant: International Engine Intellectual Property Company, LLC, Lisle, IL (US)

(72) Inventors: Khawja Naveed, Carol Stream, IL (US); Gary Steven Boone, Downers Grove, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 81 days.

(21) Appl. No.: 17/086,224

(22) Filed: Oct. 30, 2020

(65) Prior Publication Data
US 2022/0134869 A1  May 5, 2022

(51) Int. Cl.
*B60K 13/02* (2006.01)
*F02M 35/10* (2006.01)
*B62D 25/08* (2006.01)
*B60K 13/06* (2006.01)

(52) U.S. Cl.
CPC .............. *B60K 13/02* (2013.01); *B60K 13/06* (2013.01); *B62D 25/081* (2013.01); *F02M 35/10144* (2013.01); *F02M 35/10262* (2013.01)

(58) Field of Classification Search
CPC ....... B60K 13/02; B60K 13/06; B62D 25/081; F02M 35/10144; F02M 35/10262
See application file for complete search history.

(56) References Cited

U.S. PATENT DOCUMENTS

| 8,550,535 B1 | 10/2013 | Enck | |
|---|---|---|---|
| 2014/0165961 A1* | 6/2014 | Patel | F02M 35/10013 123/184.21 |

* cited by examiner

Primary Examiner — Jacob M Amick
(74) Attorney, Agent, or Firm — Jack D. Nimz; Mark C. Bach

(57) ABSTRACT

A vehicle has an upper hood duct with an air intake adjoining a hood air intake structure. A lower hood duct is connected to the upper hood duct. An on-engine air cleaner is connected to the lower hood duct. An auxiliary air inlet is arranged in the lower hood duct. The auxiliary air inlet may have an auxiliary air inlet door connected to an auxiliary air inlet door adapter by way of a hinge. The auxiliary air inlet door adapter may be connected to an auxiliary air inlet door adapter base attached to the lower hood duct. An electric or pneumatic actuator may be connected to the auxiliary air inlet door by way of an actuator door connection, and to the auxiliary air inlet door adapter by way of an actuator adapter connection.

12 Claims, 13 Drawing Sheets

SNOW DOOR INTEGRATED IN ADAPTER

BACKGROUND

This disclosure relates to a snow door for an air intake system of a vehicle and its method of use. Particularly, this disclosure relates to a snow door that is robust and durable that can easily be accessed for service or replacement without compromising the air intake system of the vehicle.

RELATED ART

Medium and heavy-duty vehicles such as dump trucks are often used as snow plows during winter months. As these vehicles move along the ground in performing their snow plowing function, they displace air. Relative to the frame of reference of the moving vehicle, the air flows past the vehicle. This airflow is laminar in some locations, turbulent in others, and at various angles oblique to the direction of travel depending on the geometry of the vehicle body, resulting in regions of high and low pressure. One location that exhibits consistently high pressure is at the base of the windshield, where the moving air must make a transition from the angle of the hood to the angle of windshield. This area is characterized by a region of turbulent recirculation, and somewhat elevated static pressure. For this reason, vehicle manufacturers often locate the vehicle engine air intake in the same area. Often, this is referred to as cowl induction. Similarly, medium and heavy-duty vehicles utilize an air inlet location that exhibits consistently high pressure near the cowl but on the side of the hood. This is because airflow with respect to taller medium and heavy duty vehicles proceeds to a greater extent around the sides of the vehicle, rather than over the top of the vehicle as is the predominant airflow with respect to passenger vehicles and light trucks.

There is, however, a disadvantage to having the vehicle engine air intake located at the base of the vehicle windshield or on the side of the hood near the cowl. When moving air enters a region of turbulent recirculation, or a region of higher pressure and lower relative velocity, it tends to precipitate anything held in suspension. As a result, snow and ice often packs full and plugs the cowl area or hood side engine air intakes, so that airflow entering therein is restricted. The situation of snow and ice entering the vehicle engine air intake is exacerbated by the fact that the opening of the air intake is relatively large and in some cases oriented vertically, in order to facilitate ease of routing and maximize airflow. Under certain conditions, sufficient snow and ice may accumulate to completely block the vehicle engine air intake, reducing the amount of airflow available to the vehicle engine and potentially resulting in a no-start condition.

Medium and heavy-duty vehicles used as snow plows are therefore sometimes provided with a feature to provide air to the engine if and when snow plugs the vehicle engine air intake. Specifically, such vehicles are sometimes optionally provided with a snow door integrated with the air cleaner assembly. The snow door is a panel in the side of the air cleaner housing that may be opened to allow air from the underhood area into the air cleaner, thereby bypassing the cowl area or hood side engine air intakes. In addition to the snow door being integrated with the air cleaner assembly, the motor used to actuate the snow door is also integrated into the air cleaner assembly. That is to say, the snow door and its motor are integrated into the same housing that contains the air cleaner filter element. This increases the complexity of the air cleaner assembly and poses a high risk to the durability of the air intake system.

Specifically, failure of the snow door or snow door motor, or any mechanism connecting the two, may require removal and/or replacement of the entire air cleaner assembly. As a minimum, this may involve removal of the air filter element, and/or disconnection of the air cleaner assembly from the air intake system, which presents the possibility of contaminating the intake system and damage to the vehicle engine due to ingestion of contaminants. Additionally, failure of the snow door or snow door motor, or any mechanism connecting the two, could result in unobserved damage to the filter, and/or ingestion of components of the snow door, the snow door motor, or the mechanism connecting the two.

Accordingly, there is an unmet need for an arrangement and method for separating the snow door from the air cleaner assembly containing the air filter element. Further, there is an unmet need for a snow door that is robust and durable that can easily be accessed for service or replacement without compromising the air intake system of the vehicle.

SUMMARY

According to one embodiment of the Snow Door Integrated in Adapter, a vehicle has an upper hood duct with an air intake adjoining a hood air intake structure. A lower hood duct is connected to the upper hood duct. An on-engine air cleaner on-engine air cleaner is connected to the lower hood duct. An auxiliary air inlet is arranged in the lower hood duct. The auxiliary air inlet may have an auxiliary air inlet door connected to an auxiliary air inlet door adapter by way of a hinge. The auxiliary air inlet door adapter may be connected to an auxiliary air inlet door adapter base attached to the lower hood duct.

According to another embodiment of the Snow Door Integrated in Adapter, an air intake system of a vehicle has an upper hood duct with an air intake adjoining a hood air intake structure. A lower hood duct is connected to the upper hood duct. An on-engine air cleaner is connected to the lower hood duct. An auxiliary air inlet is arranged in the lower hood duct. The auxiliary air inlet may be provided with an auxiliary air inlet door connected to an auxiliary air inlet door adapter by way of a hinge. The auxiliary air inlet door adapter may be connected to an auxiliary air inlet door adapter base attached to the lower hood duct.

According to another embodiment of the Snow Door Integrated in Adapter, a method of operating a vehicle in a snowy environment includes several steps including providing an upper hood duct having an air intake adjoining a hood air intake structure, connecting a lower hood duct to the upper hood duct, connecting an on-engine air cleaner to the lower hood duct, arranging an auxiliary air inlet in the lower hood duct, attaching an auxiliary air inlet door adapter base to the lower hood duct, providing the auxiliary air inlet with an auxiliary air inlet door connected to an auxiliary air inlet door adapter by way of a hinge, connecting the auxiliary air inlet door adapter to the auxiliary air inlet door adapter base, connecting an electric or pneumatic actuator to the auxiliary air inlet door by way of an actuator door connection, and to the auxiliary air inlet door adapter by way of an actuator adapter connection, and using the electric or pneumatic actuator to hold the auxiliary air inlet door closed under normal operating conditions, and using the electric or pneumatic actuator to hold the auxiliary air inlet door open when the hood air intake structure and/or the upper hood duct air intake is plugged with snow.

DETAILED DESCRIPTION

Embodiments described herein relate to a Snow Door Integrated in Adapter, and to a method for the use thereof. Embodiments of the Snow Door Integrated in Adapter and its method of use may be applied to various types of passenger vehicles, recreational vehicles, and commercial vehicles, such as highway or semi-tractors, straight trucks, buses, fire trucks, agricultural vehicles, construction vehicles, snow vehicles, campers, motorhomes, motorcycles, scooters, rail travelling vehicles, and trailers with APUs or refrigeration units. It is further contemplated that embodiments of the Snow Door Integrated in Adapter may be applied to vehicles having hybrid electric drive. It is further contemplated that, while presented herein as being used with diesel engines, embodiments of the Snow Door Integrated in Adapter may be applied to vehicles having engines configured for various fuels, such as, for non-limiting example, gasoline, propane, natural gas, and hydrogen.

More specifically, the auxiliary air inlet door of the Snow Door Integrated in Adapter can be incorporated into any vehicle provided with an internal combustion engine having an on-engine air cleaner on-engine air cleaner wherein there is a risk of restricted airflow into the air cleaner primary air inlet. An integrated approach may be taken wherein the auxiliary air inlet, or snow door, is arranged in a lower hood duct that cooperates with an upper hood duct and/or hood duct flexible element to form an air passageway between the hood, cowl tray, or hood air intake to air cleaner duct and the on-engine air cleaner. This approach is taken in order to simplify manufacturing, provide ease of maintenance and/or replacement, and reduce overall complexity, thus reducing risk and reducing cost. The main components of the Snow Door Integrated in Adapter consist of an auxiliary air inlet door adapter that may snap into an auxiliary air inlet door adapter base, which is connected to a lower hood duct that is connected to the on-engine air cleaner.

An auxiliary air inlet door is hinged on the auxiliary air inlet door adapter, and can be opened and closed by an electric or pneumatic actuator. The auxiliary air inlet door seals against the auxiliary air inlet door adapter and remains closed during normal operation. The auxiliary air inlet door may be opened when the air cleaner primary air inlet becomes obstructed, for non-limiting example by snow.

Figure 1:
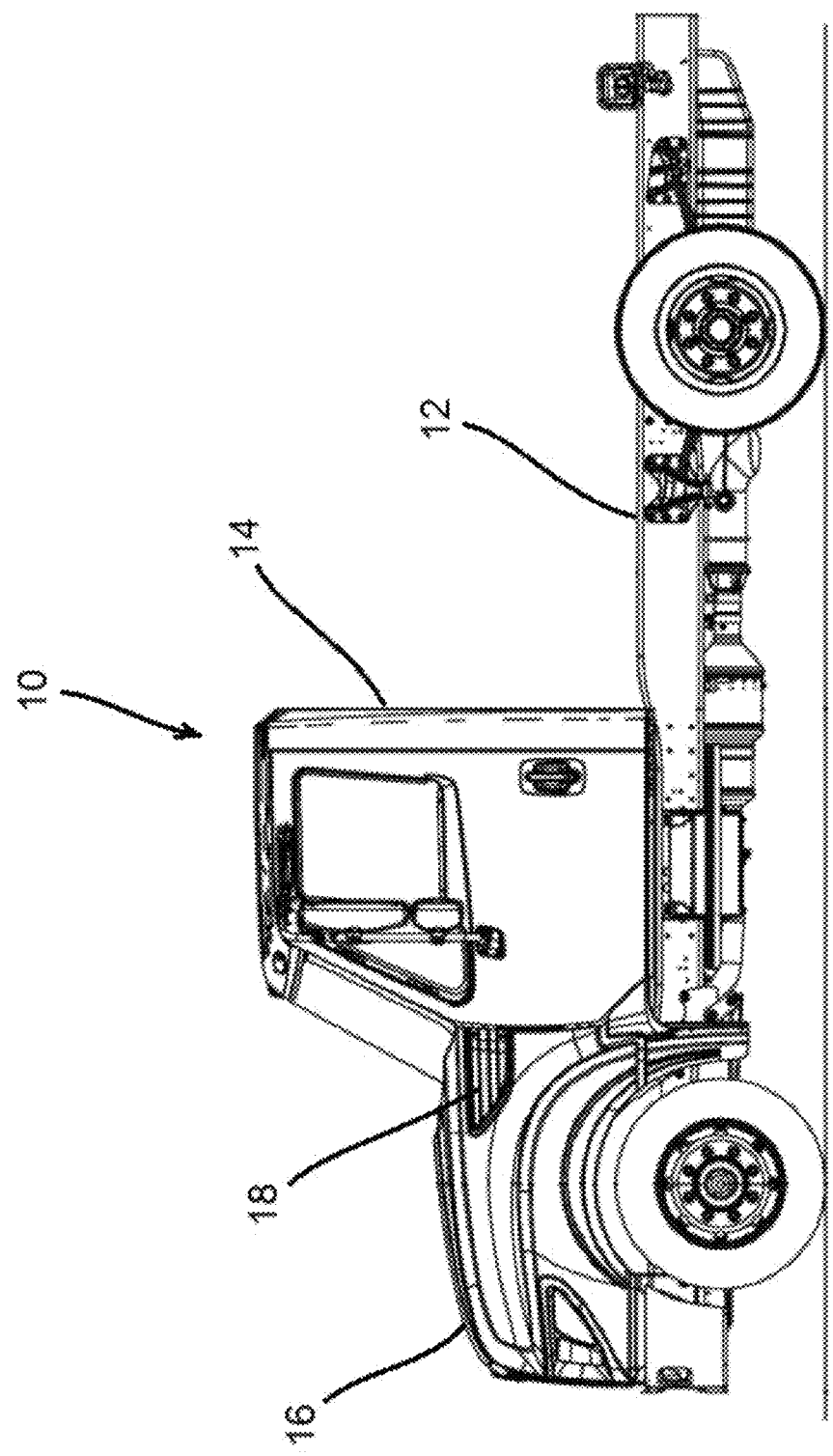
FIG. 1 is a side view of a vehicle having an embodiment of a Snow Door Integrated in Adapter according to the present disclosure, as described herein.

Referring now to FIG. 1, a side view of a vehicle 10 having an embodiment of a Snow Door Integrated in Adapter and its method of use is shown. The vehicle 10 includes a chassis 12, a cab 14, and a hood 16. A hood air intake 18 provides an inlet for air to be used by an engine (not shown in FIG. 1).

Figure 2:
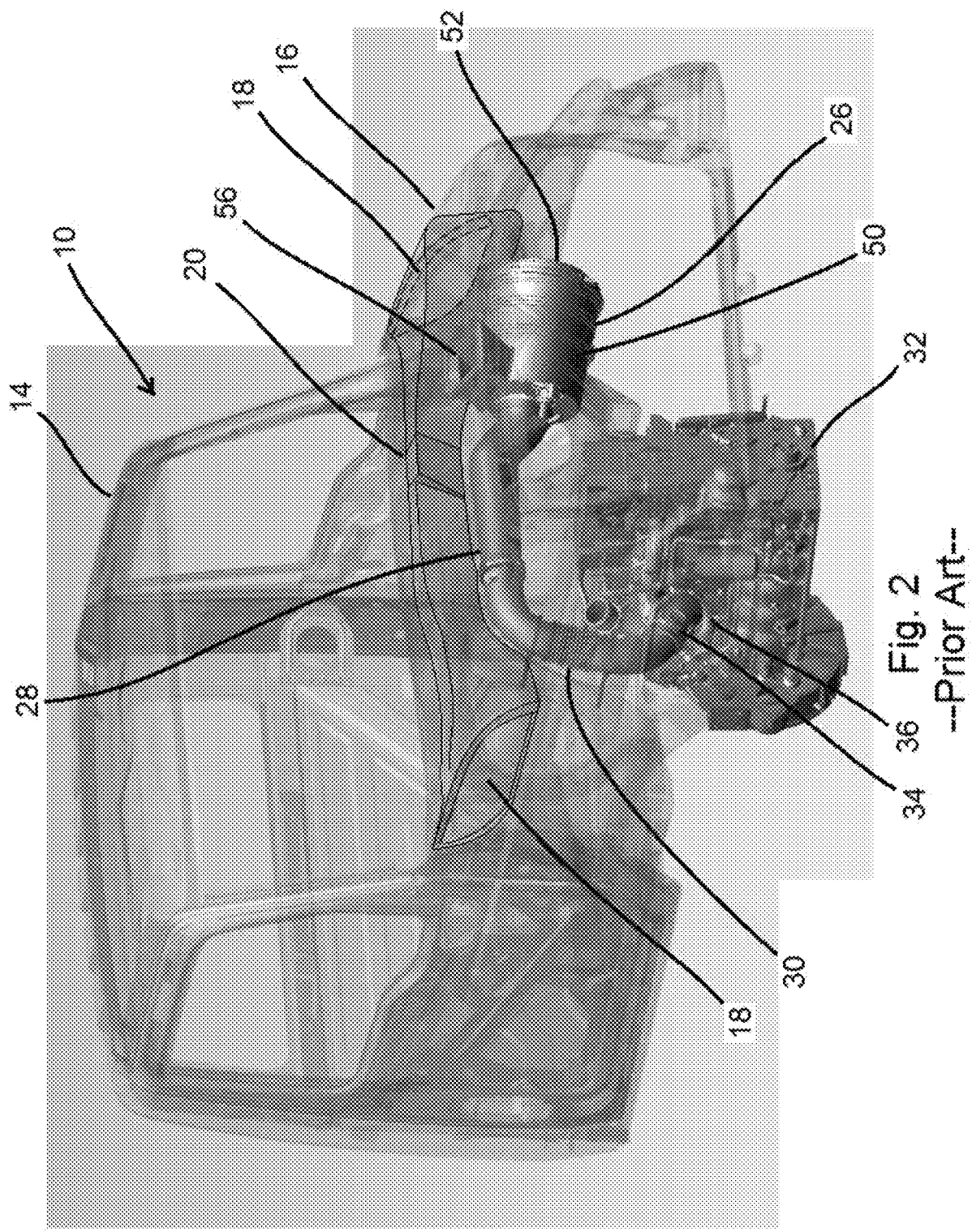
FIG. 2 is a perspective view of an engine air intake system having a known air cleaner assembly with a snow door integrated into the air cleaner housing, as described herein.
Figure 3:
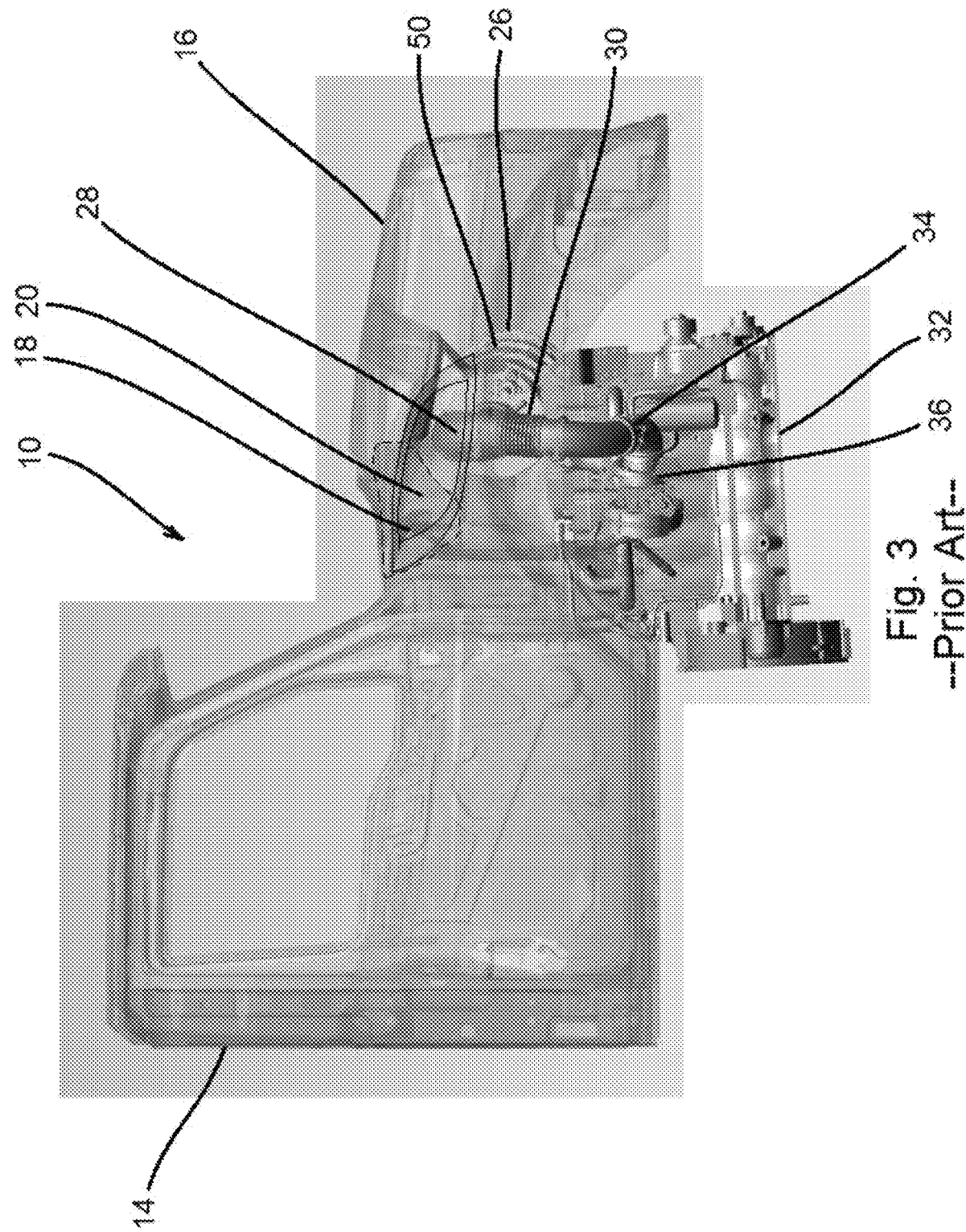
FIG. 3 is a side view of an engine air intake system having a known air cleaner assembly with a snow door integrated into the air cleaner housing, as described herein.

Turning now to FIGS. 2 and 3, a perspective view and a side view, respectively, of a vehicle 10 having a cab 14 and a hood 16 is shown. The hood 16 is provided with a hood air intake 18 that is connected to a hood air intake to air cleaner duct 20. A known air cleaner assembly 26 has an air cleaner primary air inlet 56 that adjoins the hood air intake to air cleaner duct 20 in such a way that when the hood 16 is closed, the air cleaner assembly 26 draws air from the hood air intake to air cleaner duct 20. The air cleaner assembly 26 is provided with an air cleaner housing 50 having an air cleaner housing lid 52 and containing an air cleaner filter element (not shown). An air cleaner to engine air intake pipe assembly 28 is connected to the air cleaner assembly 26, and conducts filtered air from the air cleaner assembly 26 to an engine air intake 34 of an engine 32. In this example, the engine air intake 34 is the intake of a turbocharger 36 that is connected to the engine 32. In order to accommodate relative movement between the engine 32 and the air cleaner assembly 26, the air cleaner to engine air intake pipe assembly 28 may be provided with a section of flex pipe 30.

Figure 4:
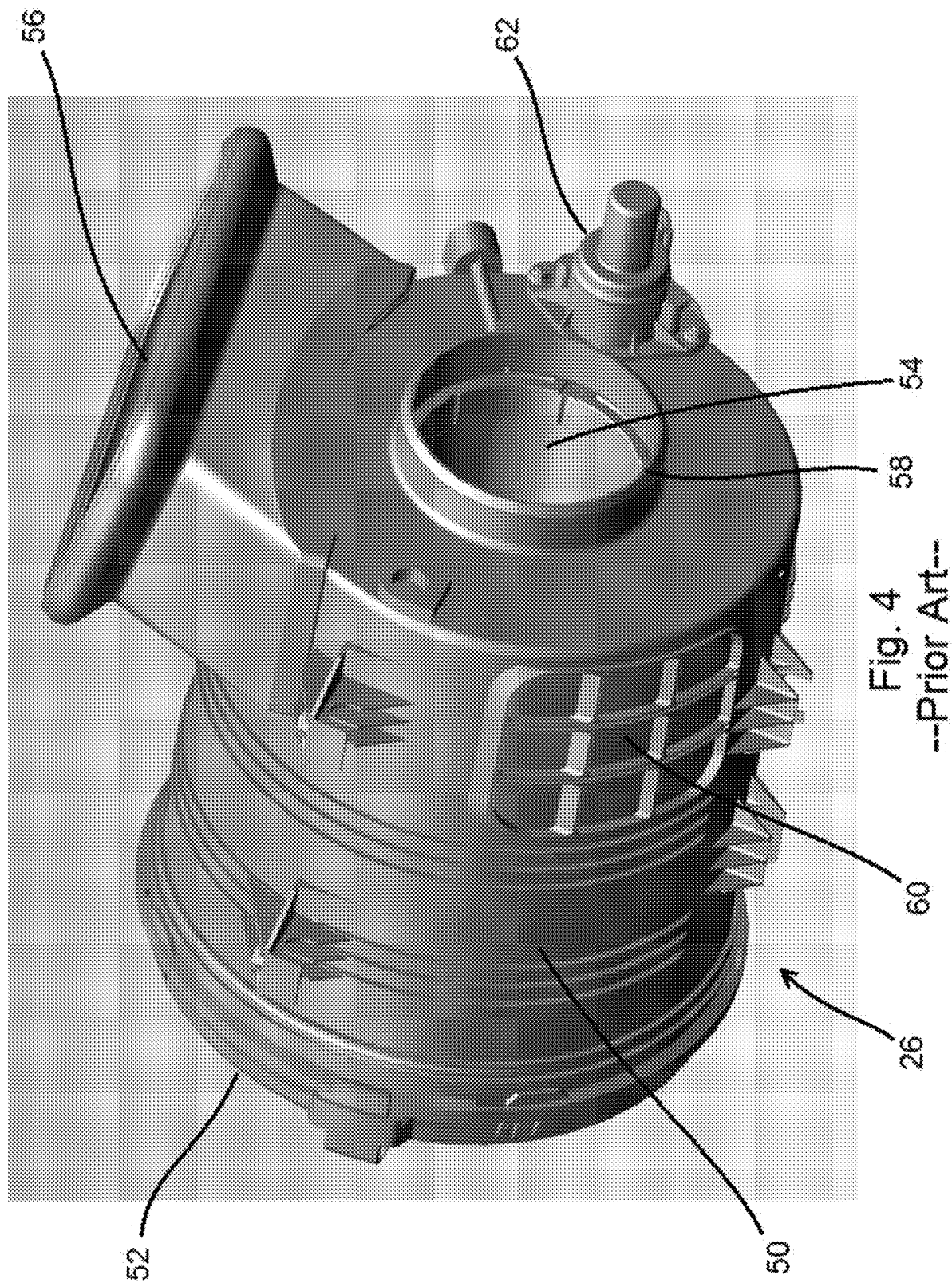
FIG. 4 is a perspective view of a known air cleaner assembly with a snow door integrated into the air cleaner housing, as described herein.
Figure 5:
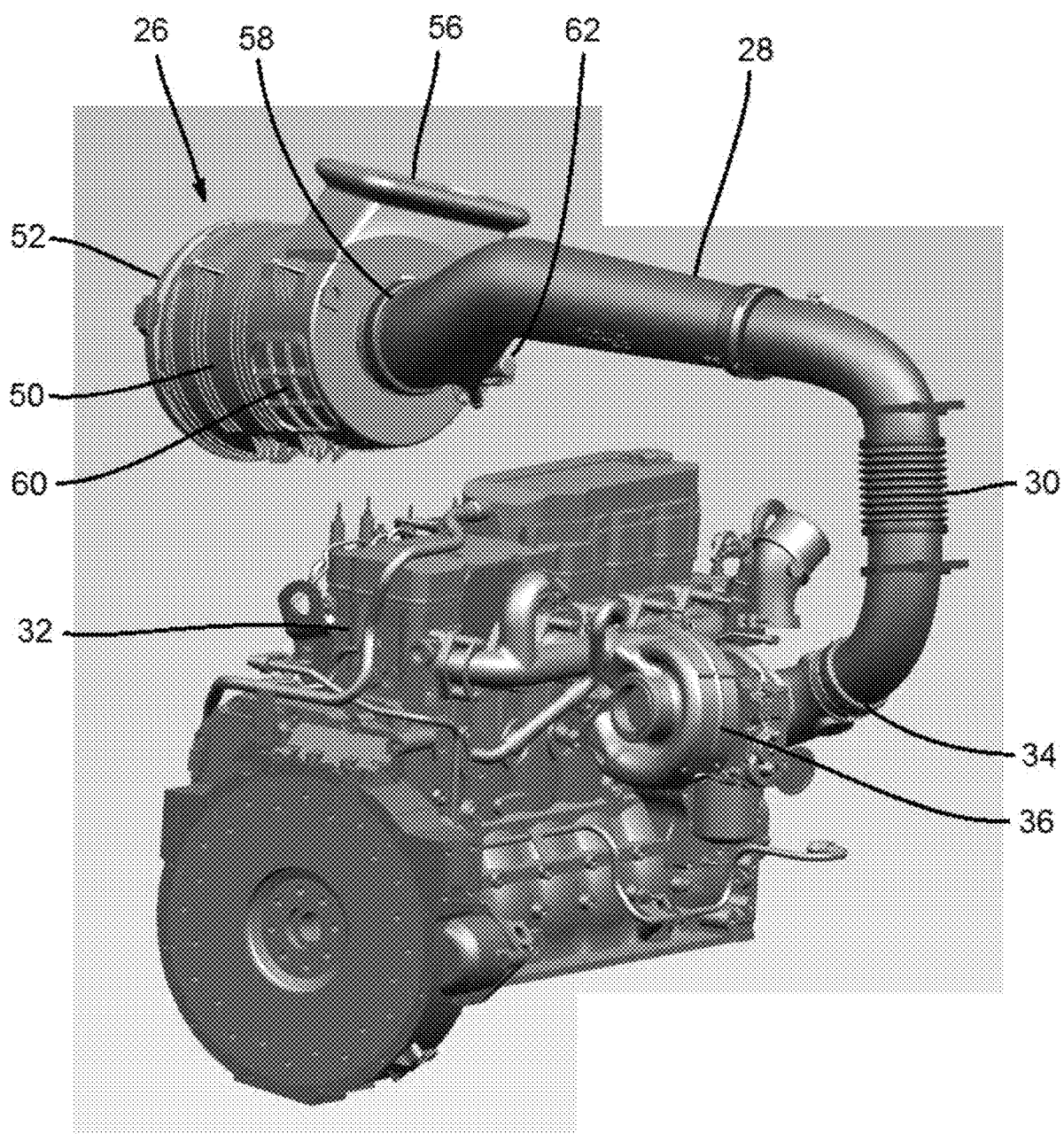
FIG. 5 is a perspective view of an engine air intake system having a known air cleaner assembly with a snow door integrated into the air cleaner housing, as described herein.
Figure 6:
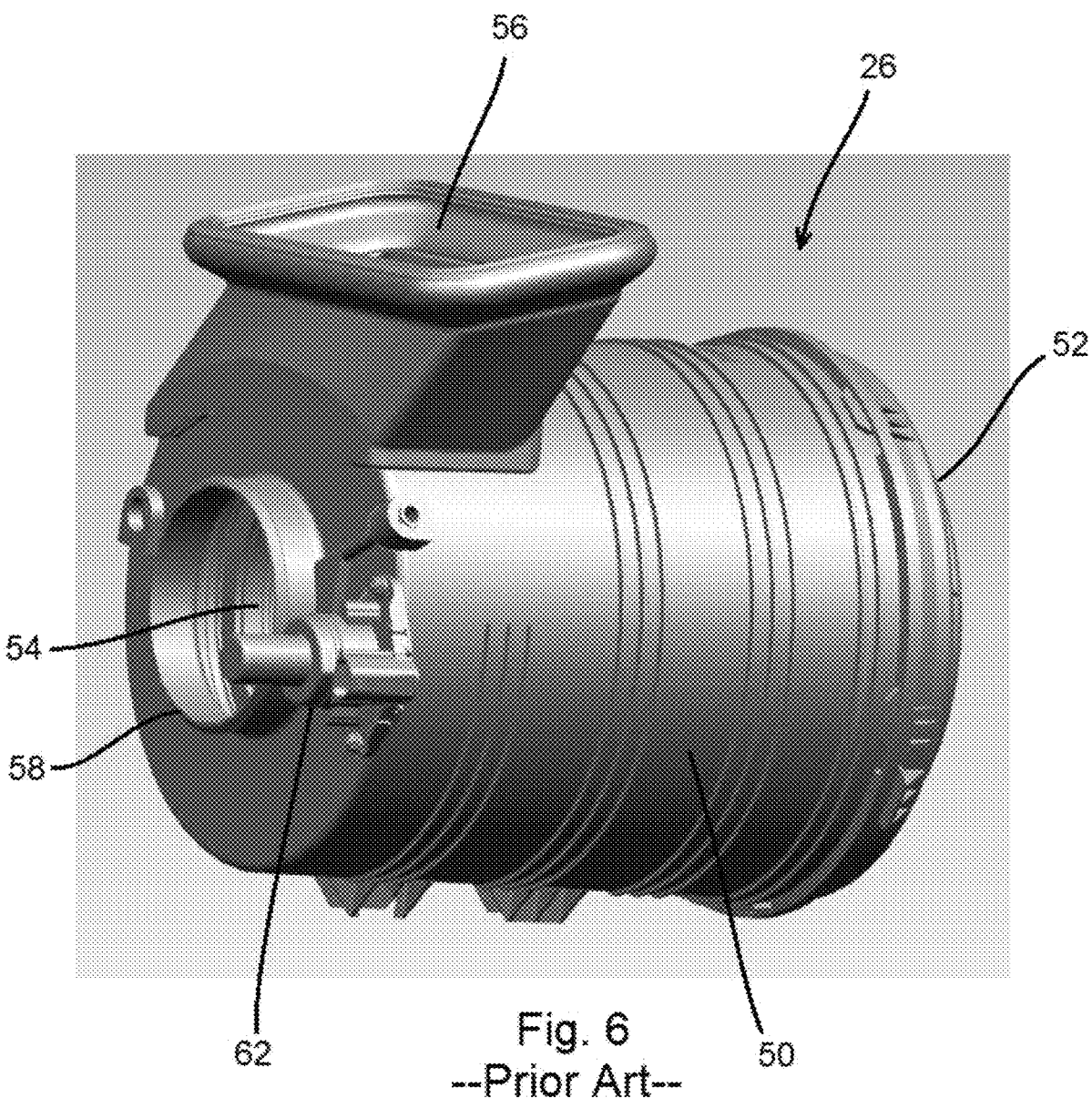
FIG. 6 is a perspective view of a known air cleaner assembly with a snow door integrated into the air cleaner housing, as described herein.
Figure 7:
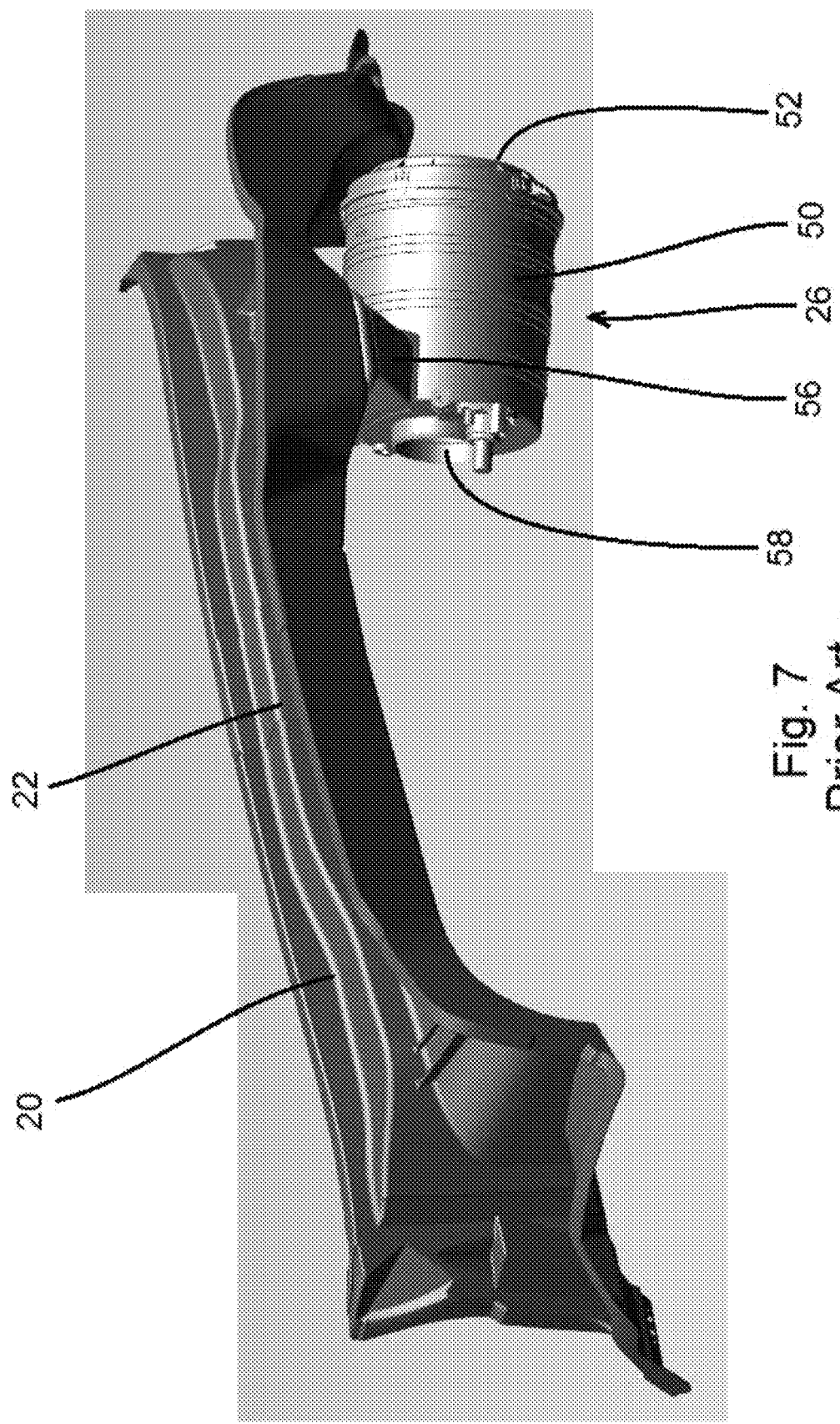
FIG. 7 is a perspective view of a cowl tray and known air cleaner assembly with a snow door integrated into the air cleaner housing, as described herein.

FIGS. 4 through 7 show for the sake of illustration a known air cleaner assembly 26 variously disconnected from an air intake system (FIGS. 4 and 6), connected to an engine 32 by way of an air cleaner to engine air intake pipe assembly 28 (FIG. 5), and connected to a hood air intake to air cleaner duct 20 (FIG. 7). As shown in FIGS. 4 and 6, the air cleaner assembly 26 is again provided with an air cleaner housing 50 having an air cleaner housing lid 52 and containing an air cleaner filter element 54. The air cleaner housing 50 of the air cleaner assembly 26 is provided with an air cleaner primary air inlet 56 and an air cleaner outlet 58. As shown in FIG. 5, the air cleaner outlet 58 of the air cleaner assembly 26 provides filtered air to the engine air intake 34 of the engine 32 by way of the air cleaner to engine air intake pipe assembly 28. In this example, the engine air intake 34 is the intake of a turbocharger 36 that is connected to the engine 32. In order to accommodate relative movement between the engine 32 and the air cleaner assembly 26, the air cleaner to engine air intake pipe assembly 28 may be provided with a section of flex pipe 30.

As shown in FIG. 7, the air cleaner primary air inlet 56 of the air cleaner assembly 26 adjoins the hood air intake to air cleaner duct 20, which in FIG. 7 is embodied, for example, as a cowl tray 22. In each of air cleaner assemblies 26 shown in FIGS. 4 through 7, the air cleaner housing 50 of the air cleaner assembly 26 is provided with an air cleaner snow door 60 that is actuated by an air cleaner snow door motor 62. For example, the air cleaner snow door 60 of the known air cleaner assembly 26 shown in FIGS. 4 through 7 may be an annular sliding door as shown in U.S. Pat. No. 6,395,048, the disclosure of which is incorporated herein in its entirety by this reference.

Figure 8:
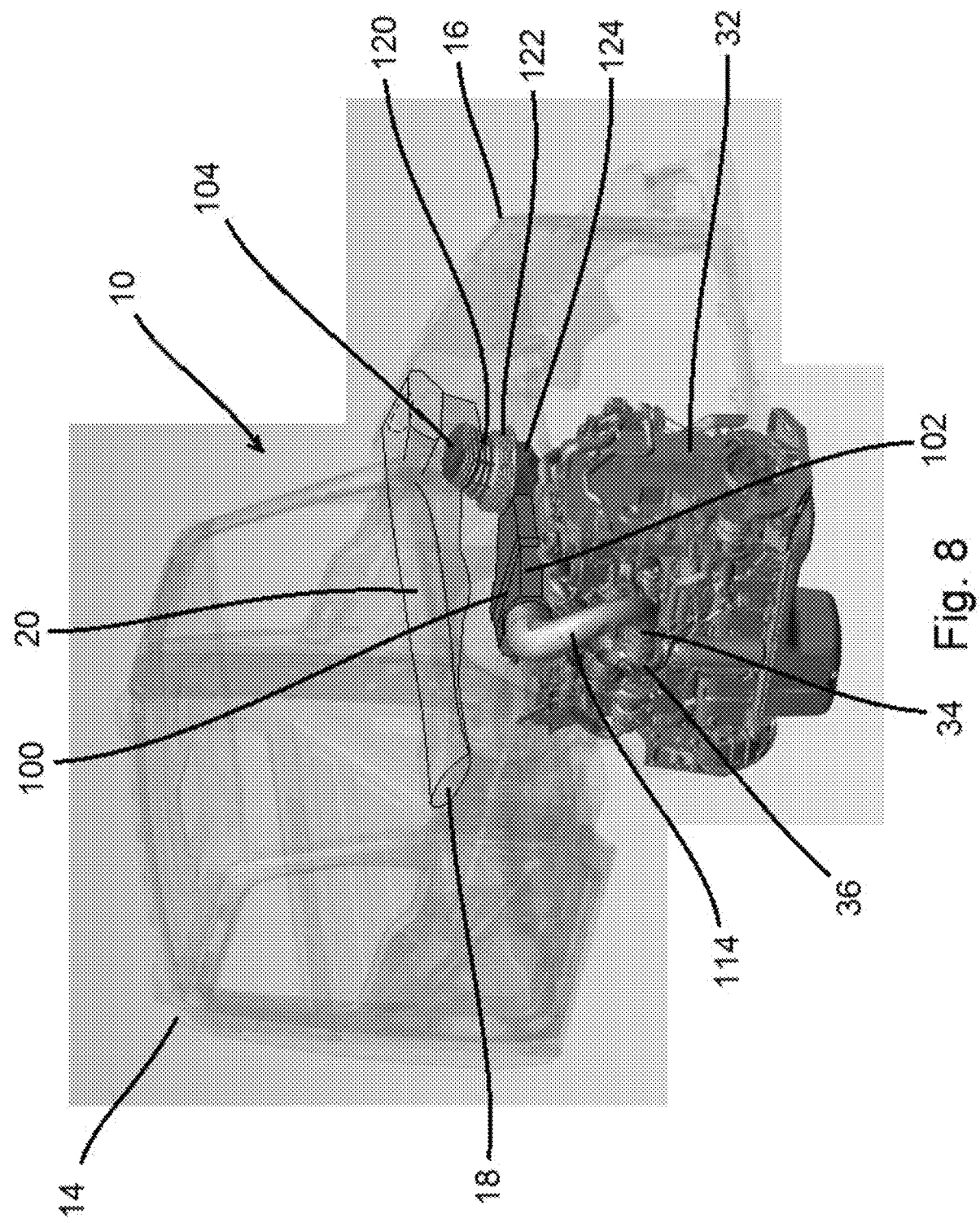
FIG. 8 is a perspective view of a vehicle having an embodiment of a Snow Door Integrated in Adapter according to the present disclosure, as described herein.
Figure 9:
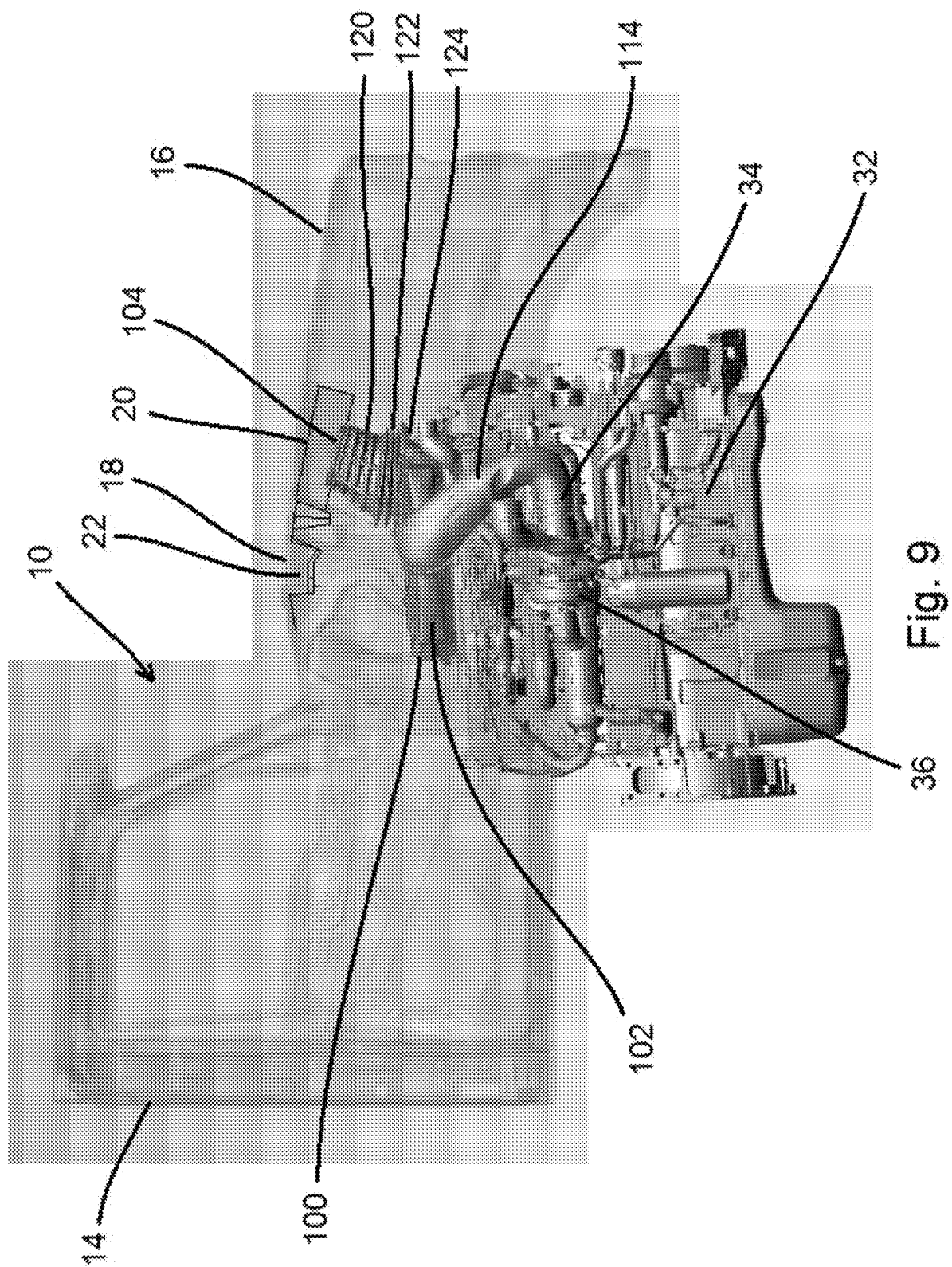
FIG. 9 is a side view of a vehicle having an embodiment of a Snow Door Integrated in Adapter according to the present disclosure, as described herein.
Figure 10:
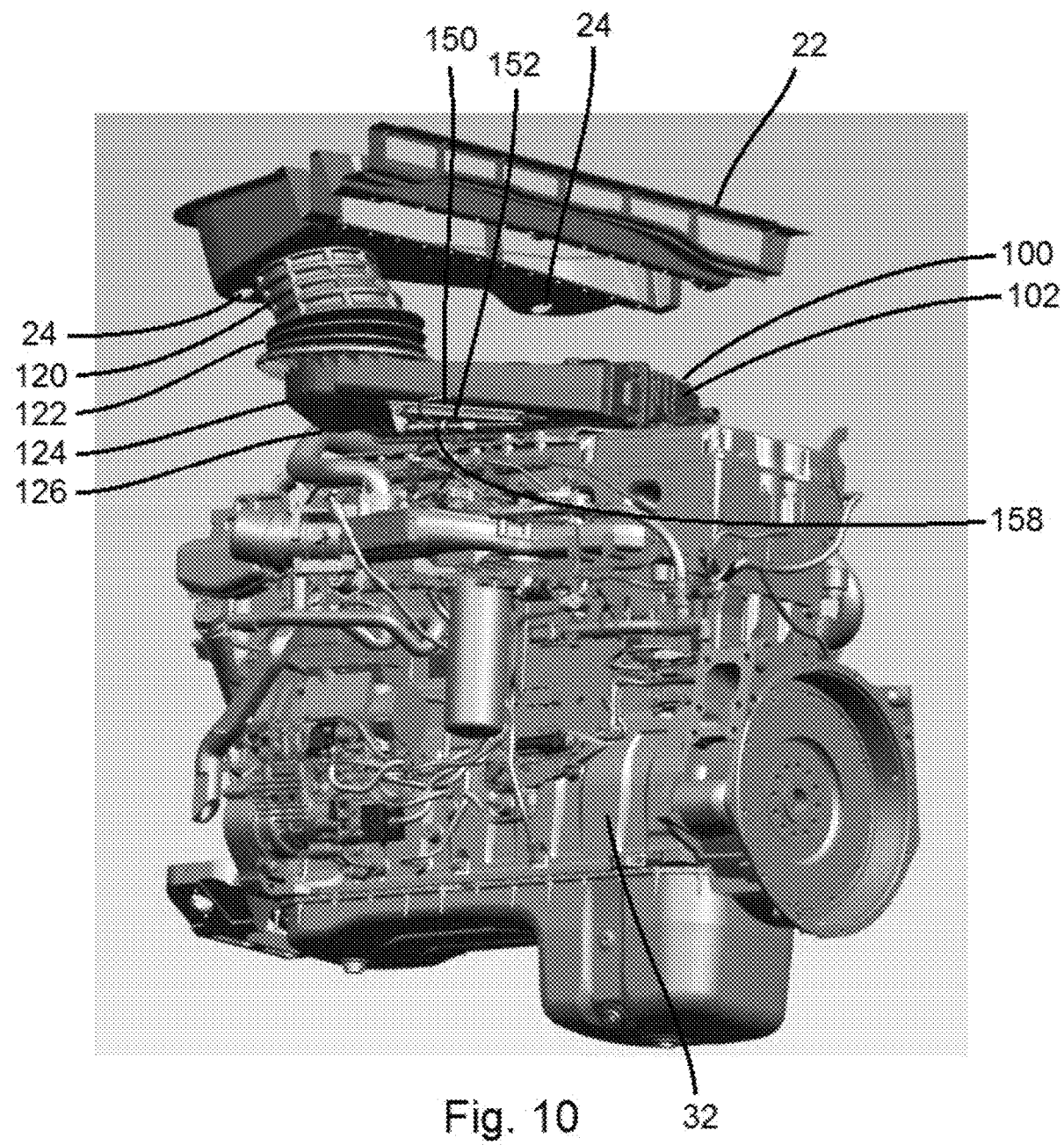
FIG. 10 is a perspective view of an embodiment of a Snow Door Integrated in Adapter according to the present disclosure, as described herein.
Figure 11:
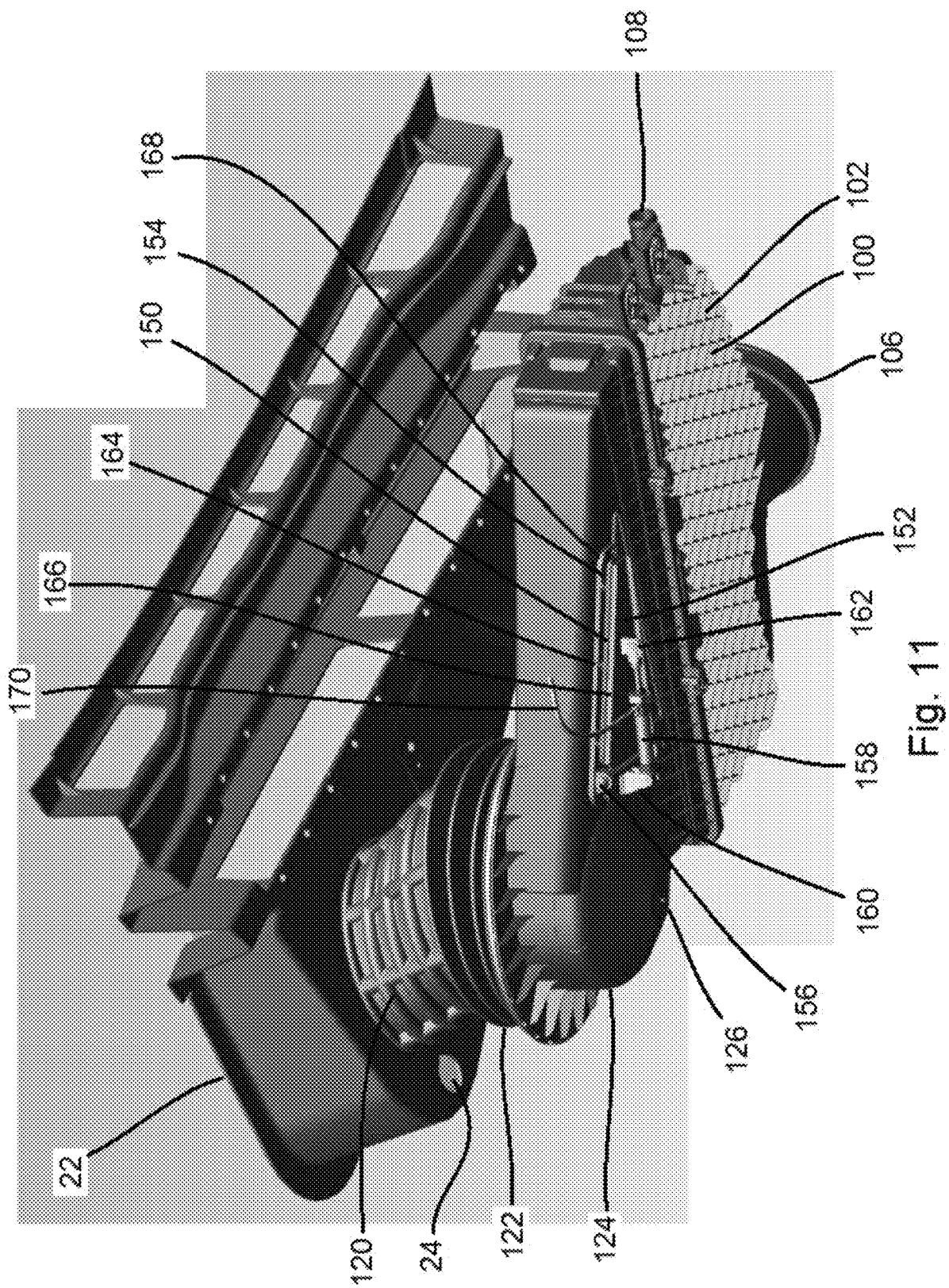
FIG. 11 is a perspective view of an embodiment of a Snow Door Integrated in Adapter according to the present disclosure, as described herein.
Figure 12:
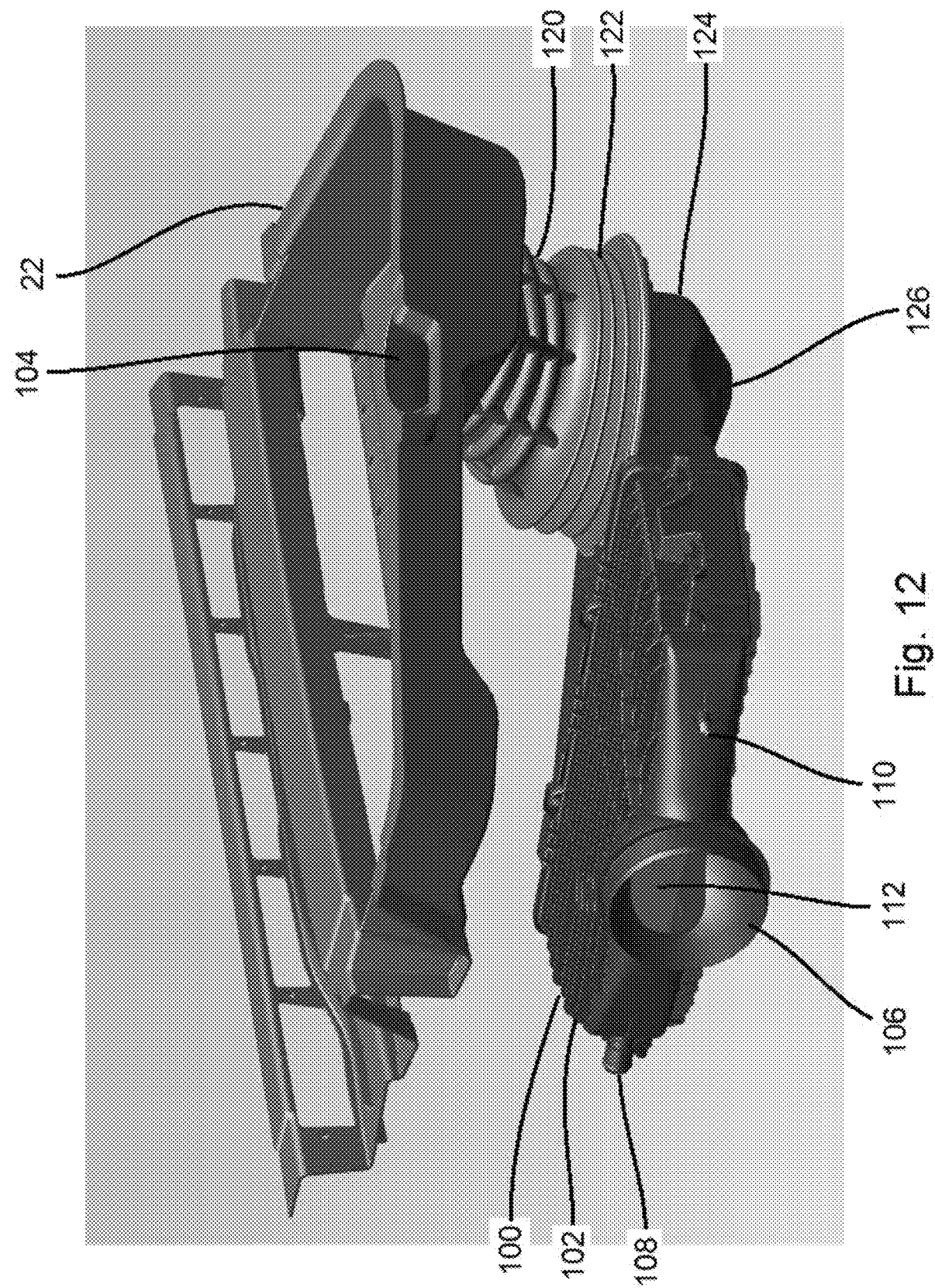
FIG. 12 is a perspective view of an embodiment of a Snow Door Integrated in Adapter according to the present disclosure, as described herein.
Figure 13:
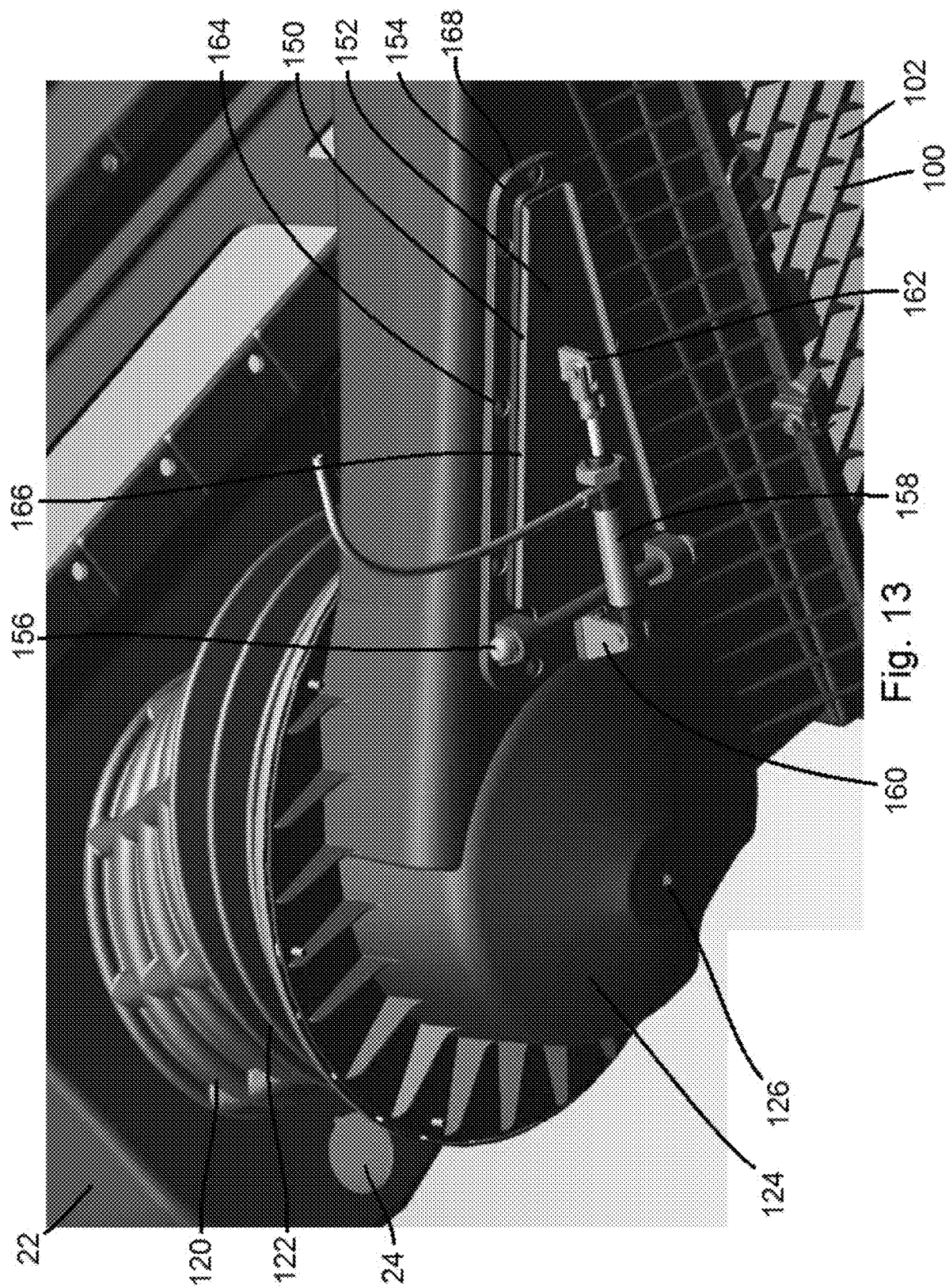
FIG. 13 is a perspective view of an embodiment of a Snow Door Integrated in Adapter according to the present disclosure, as described herein.

Turning now to FIGS. 8 and 9, an embodiment of the Snow Door Integrated in Adapter is shown. A vehicle 10 again has a cab 14 and a hood 16 having at least one hood air intake 18. The at least one hood air intake 18 may be connected to a hood air intake to air cleaner duct 20, which may be embodied as a cowl tray 22. The engine 32 of the vehicle 10 is provided with an on-engine air cleaner 100 having an air cleaner housing 102 and an air cleaner filter element (not shown). The on-engine air cleaner 100 is connected to the hood air intake to air cleaner duct 20 by way of an upper hood duct 120 and a lower hood duct 124, having a hood duct flexible element 122 located therebetween. The upper hood duct 120 is provided with an air cleaner primary air inlet 104, which adjoins the hood air intake to air cleaner duct 20 in such a way that when the hood 16 is closed, the on-engine air cleaner 100 draws air from the hood air intake to air cleaner duct 20 by way of the upper hood duct 120, the lower hood duct 124, and the hood duct flexible element 122. The on-engine air cleaner 100 is connected by way of an air cleaner to engine air intake pipe 114 to the engine air intake 34, which in the present non-limiting example, is the intake of a turbocharger 36 that is connected to the engine 32.

Turning now to FIGS. 10 through 13, an embodiment of the Snow Door Integrated in Adapter is shown. An engine 32 of a vehicle is again provided with an on-engine air cleaner 100 having an air cleaner housing 102 and an air cleaner filter element 112. The on-engine air cleaner 100 is again connected to a cowl tray 22 by way of an upper hood duct 120 and a lower hood duct 124, having a hood duct flexible element 122 located therebetween. The cowl tray 22 may be provided with cowl tray drain ports 24, and the lower hood duct 124 may be provided with a lower hood duct drain port 126. The upper hood duct 120 is again provided with an air cleaner primary air inlet 104, which adjoins the cowl tray 22 in such a way that the on-engine air cleaner 100 draws air from the cowl tray 22 by way of the upper hood duct 120, the lower hood duct 124, and the hood duct flexible element 122. The on-engine air cleaner 100 has an air cleaner housing outlet 106 that is connected by way of an air cleaner to engine air intake pipe (not visible) to the engine air intake (not visible). The air cleaner housing 102 of the on-engine air cleaner 100 may also be provided with a crankcase vent inlet 108 and/or an air filter restriction gage port 110.

In the embodiment of the Snow Door Integrated in Adapter shown in FIGS. 10 through 13, an auxiliary air inlet 150 is provided in the lower side of the lower hood duct 124. The auxiliary air inlet 150 has an auxiliary air inlet door 152 connected to an auxiliary air inlet door adapter 154 by way of a hinge 156. The auxiliary air inlet door adapter 154 is connected to an auxiliary air inlet door adapter base 168, to which it may be retained using auxiliary air inlet door fasteners 164. The auxiliary air inlet door fasteners 164 may be, for non-limiting example, nylon ribbed push-in rivets, nylon keyhole push-in rivets, expanding push-in rivets, or other plastic automotive rivets, or may be another type of interference-fit snap or push together fastening device. Alternately, the auxiliary air inlet door adapter 154 may be connected to the auxiliary air inlet door adapter base 168 in such a way that it simply snaps into the auxiliary air inlet door adapter base 168. Still alternately, the auxiliary air inlet door adapter 154 may be attached to the auxiliary air inlet door adapter base 168 using ordinary fasteners such as, for non-limiting example, screws.

An electric or pneumatic actuator 158 is connected to the auxiliary air inlet door 152 by way of an actuator door connection 162, and is connected to the auxiliary air inlet door adapter 154 by way of an actuator adapter connection 160. In this way, the electric or pneumatic actuator 158, which is provided with an electric or pneumatic connection 170, is able to open and close the auxiliary air inlet door 152. In order to securely close the auxiliary air inlet door 152, a reinforcing flange 166 is provided in the auxiliary air inlet door 152, thereby allowing the electric or pneumatic connection 170 to exert sufficient pressure without buckling the auxiliary air inlet door 152. Because the hinge 156 and the actuator door connection 162 are connected to the auxiliary air inlet door adapter 154, and as the auxiliary air inlet door 152 closes against the auxiliary air inlet door adapter 154, the auxiliary air inlet door 152, hinge 156, electric or pneumatic actuator 158, and auxiliary air inlet door adapter 154 may be removed from the auxiliary air inlet door adapter base 168 as an assembly whenever service or replacement becomes necessary, without otherwise disassembling any other part of the engine air intake system.

In this way, the Snow Door Integrated in Adapter allows for continued vehicle operation and prevents the driver from having to stop and manually clear blockage in the cowl from snow and ice in order to start the vehicle and/or maintain operation. The Snow Door Integrated in Adapter may be implemented, for non-limiting example, when the primary use of the vehicle is for plowing snow. If the Snow Door Integrated in Adapter becomes damaged or otherwise inoperable, it may be replaced with minimal time, effort, and tools, and without compromising the air intake system of the vehicle. Furthermore, if the Snow Door Integrated in Adapter becomes damaged or otherwise inoperable under circumstances where replacement parts are not available, temporary repairs may be affected using readily available materials because of the fact that the auxiliary air inlet 150 and auxiliary air inlet door 152 are entirely external to the lower hood duct 124. Moreover, the Snow Door Integrated in Adapter may be provided with a backup latch to hold the auxiliary air inlet door 152 closed (not shown), and/or a switch or valve (not shown) to isolate the electric or pneumatic actuator 158.

While the Snow Door Integrated in Adapter and its method of use has been described with respect to at least one embodiment, the arrangement and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having a Snow Door Integrated in Adapter, comprising:
    an upper hood duct having an air intake adjoining a hood air intake structure;

a lower hood duct connected to the upper hood duct;

an on-engine air cleaner connected to the lower hood duct; and an auxiliary air inlet arranged in the lower hood duct, the auxiliary air inlet being provided with an auxiliary air inlet door connected to an auxiliary air inlet door adapter by way of a hinge, the auxiliary air inlet door adapter being connected to an auxiliary air inlet door adapter base, the auxiliary air inlet door adapter base being attached to the lower hood duct, the auxiliary air inlet door adapter being retained to the auxiliary air inlet door adapter base using auxiliary air inlet door fasteners.

2. The vehicle of claim 1
the auxiliary air inlet door fasteners being at least one of:
nylon ribbed push-in rivets,
nylon keyhole push-in rivets,
expanding push-in rivets,
plastic automotive rivets, and
an interference-fit snap or push together fastening device.

3. The vehicle of claim 1, further comprising:
an electric or pneumatic actuator connected to the auxiliary air inlet door by way of an actuator door connection, and connected to the auxiliary air inlet door adapter by way of an actuator adapter connection.

4. The vehicle of claim 3, further comprising at least one of:
a backup latch arranged to selectively hold the auxiliary air inlet door closed, and
a switch or valve arranged to selectively isolate the electric or pneumatic actuator.

5. The vehicle of claim 1
the hood air intake structure being at least one of:
at least one hood air intake,
a hood air intake to air cleaner duct, and
a cowl tray.

6. The vehicle of claim 1
the lower hood duct being connected to the upper hood duct by way of a hood duct flexible element.

7. An air intake system of a vehicle, comprising:
an upper hood duct having an air intake adjoining a hood air intake structure;
a lower hood duct connected to the upper hood duct;
an on-engine air cleaner connected to the lower hood duct; and
an auxiliary air inlet arranged in the lower hood duct, the auxiliary air inlet being provided with an auxiliary air inlet door connected to an auxiliary air inlet door adapter by way of a hinge, the auxiliary air inlet door adapter being connected to an auxiliary air inlet door adapter base, the auxiliary air inlet door adapter base being attached to the lower hood duct.

8. The air intake system of claim 7
the auxiliary air inlet door fasteners being at least one of:
nylon ribbed push-in rivets,
nylon keyhole push-in rivets,
expanding push-in rivets,
plastic automotive rivets, and
an interference-fit snap or push together fastening device.

9. The air intake system of claim 7, further comprising:
an electric or pneumatic actuator connected to the auxiliary air inlet door by way of an actuator door connection, and connected to the auxiliary air inlet door adapter by way of an actuator adapter connection.

10. The air intake system of claim 7, further comprising at least one of:
a backup latch arranged to selectively hold the auxiliary air inlet door closed; and
a switch or valve arranged to selectively isolate the electric or pneumatic actuator.

11. The air intake system of claim 7
the hood air intake structure being at least one of:
at least one hood air intake,
a hood air intake to air cleaner duct, and
a cowl tray.

12. The air intake system of claim 7
the lower hood duct being connected to the upper hood duct by way of a hood duct flexible element.

* * * * *